Aug. 12, 1969   E. H. BUCKNELL ET AL   3,460,570
BALANCED CONTROL MIXING VALVE
Original Filed Oct. 22, 1965   4 Sheets-Sheet 1
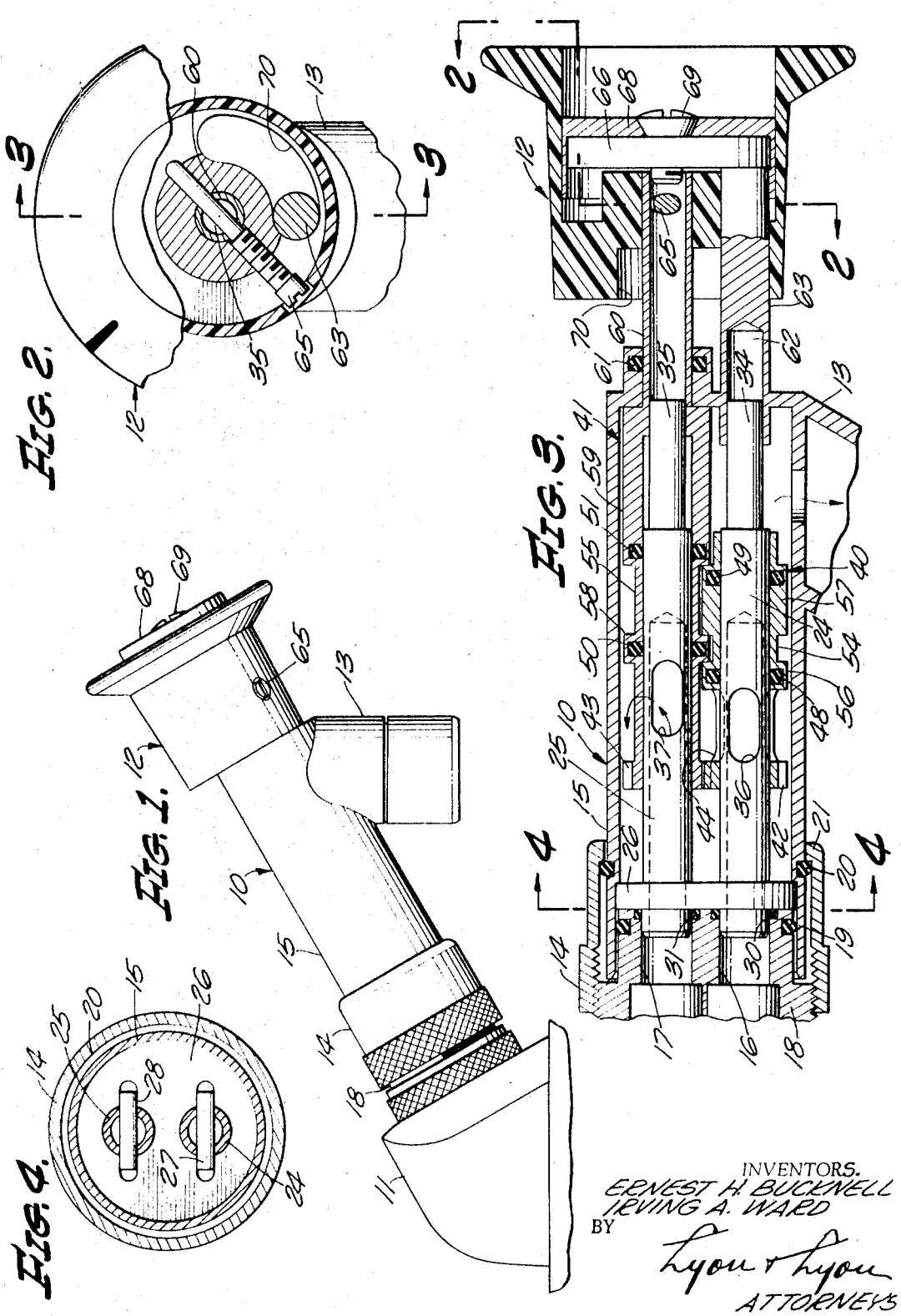
INVENTORS.
ERNEST H. BUCKNELL
IRVING A. WARD
BY
Lyon & Lyon
ATTORNEYS

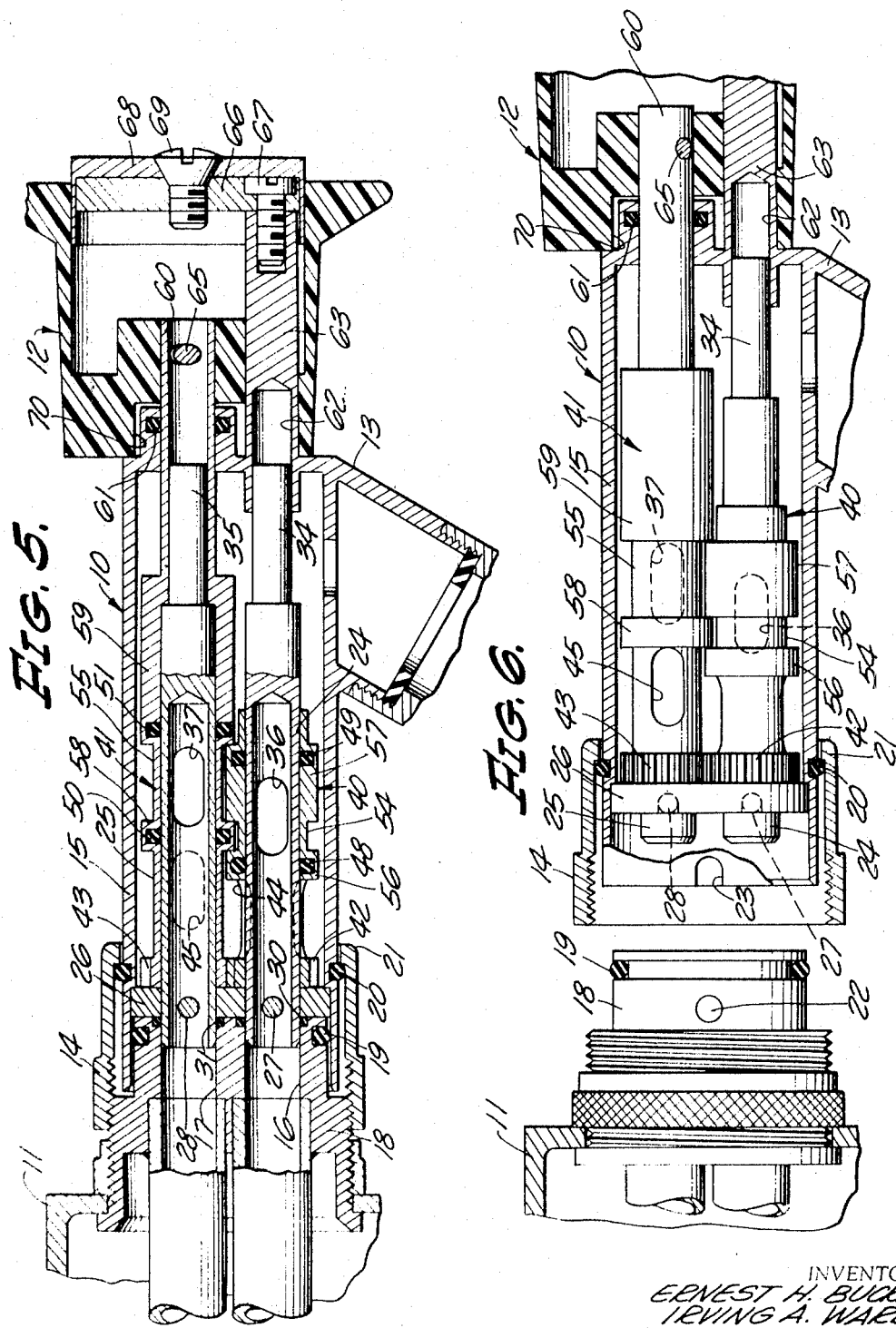

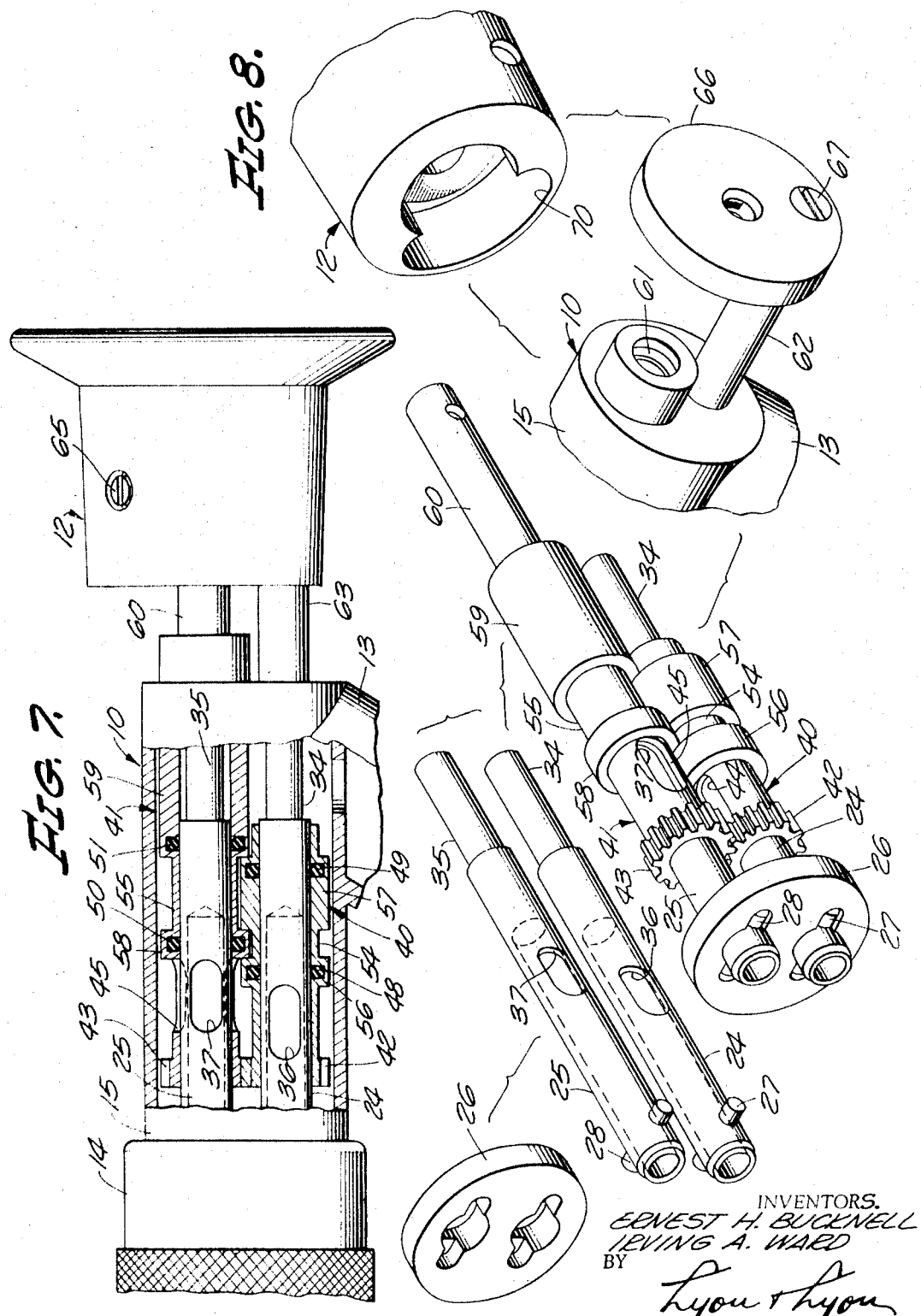

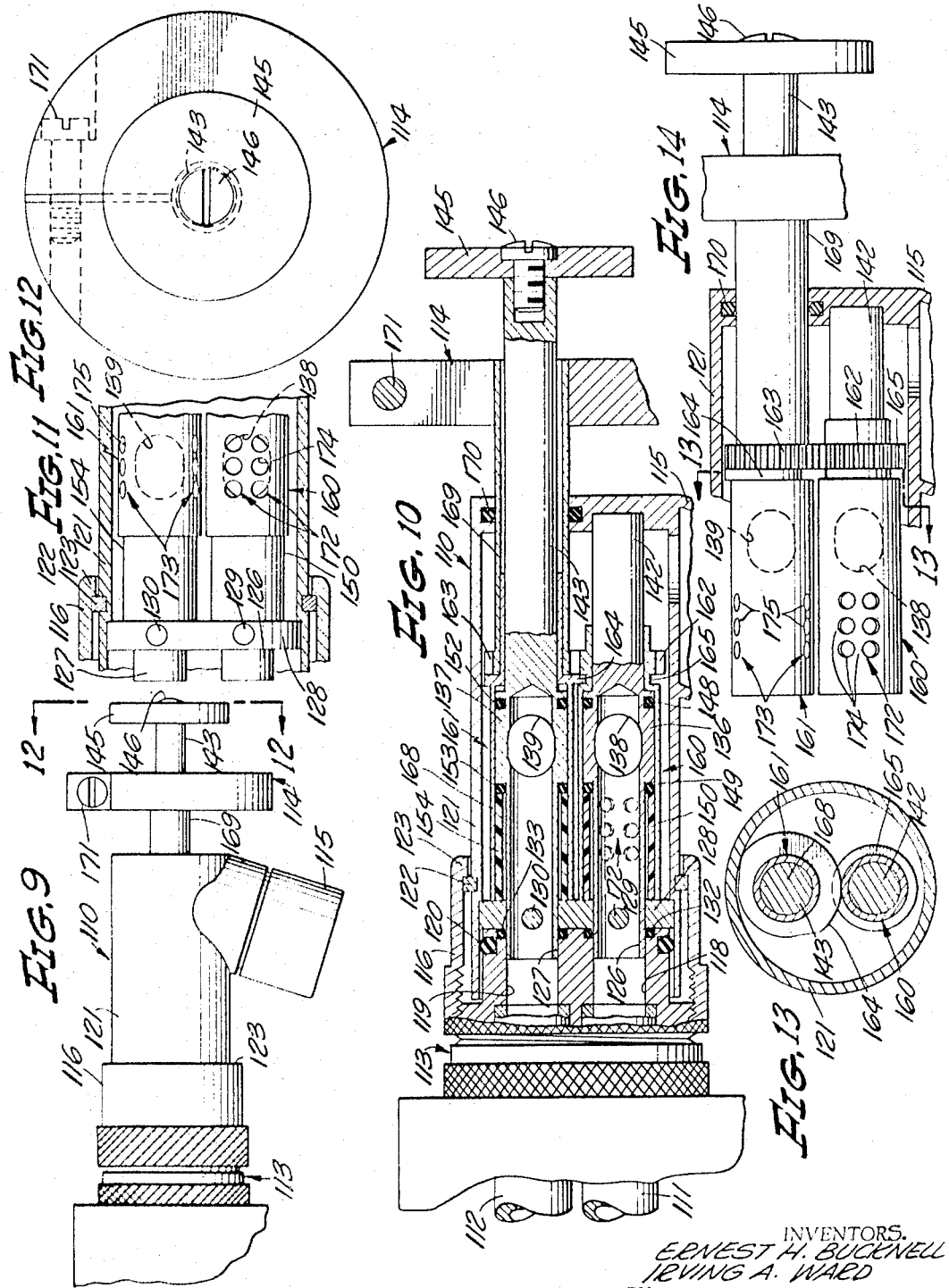

United States Patent Office 3,460,570
Patented Aug. 12, 1969

3,460,570
BALANCED CONTROL MIXING VALVE
Ernest H. Bucknell and Irving A. Ward, Los Angeles, Calif., assignors of ten percent to the trust of Ralph E. Bletcher, deceased; five percent each to Frederick Robertson and Gary Robertson; ten percent each to Lenora Bucknell and Richard J. Bletcher; five percent to Marcia Liston as trustee for Daniel E. Liston; five percent each to Carol Ann Liston, and James H. Liston; 10 percent each to Hazel Brondum and Pearl Bletcher; fifteen percent to Marcia Liston, and ten percent to Ernest H. Bucknell
Continuation of applications Ser. No. 501,389, and Ser. No. 501,007, Oct. 22, 1965. This application Jan. 16, 1968, Ser. No. 705,879
Int. Cl. F16k 11/02, 11/06; F17d 3/00
U.S. Cl. 137—607          14 Claims

ABSTRACT OF THE DISCLOSURE

A control valve having a single control member for varying the volume and relative amounts of inlet fluids, such as hot and cold water. The valve includes a pair of inlet plugs adapted to receive fluid along the longitudinal axes thereof, the plugs having discharge ports. Sleeves are mounted over the plugs and have discharge openings therein. The discharge ports and openings are substantially normal to the inlet fluid flow. The sleeves are coupled together and may be rotated and moved longitudinally with respect to the plugs for varying the fluid output.

---

The present application is a continuation of U.S. patent application Ser. No. 501,389 entitled "Balanced Control Valve," now abandoned, and U.S. patent application Ser. No. 501,007, entitled "A Mixing Valve Having Internal Stop," now abandoned, both filed by applicants on Oct. 22, 1965.

This invention relates to a control valve and more particularly to an improved mixing type control valve for varying the volume of flow of inlet streams as well as the proportionate amounts thereof.

Various types of control valves employing a single control knob or lever for varying the volume and relative amounts of inlet fluids, such as hot and cold water, have been devised. Such valves are widely used, and it is desirable that they be of relatively rugged and simple construction, reliable and easy to operate.

It is particularly desirable to provide control valves of this nature which are easy to operate throughout their control range. Certain prior art mixing type control valves are characterized by greater difficulty of operation at the extreme limits of control, such as at and near the "on" and "off" positions thereof, because of the internal effects of pressure. A balanced control valve which overcomes such difficulties is described in U.S. patent application Ser. No. 46,657 entitled "Control Valve," filed by applicants on June 24, 1965, the disclosure of which is incorporated herein by reference.

It is an object of the present invention to provide an improved control valve wherein the fluid pressures therein are balanced so as to eliminate positional changes in the components of the control valve as a result of fluid pressures.

It is another object of this invention to provide an improved balanced control valve which is operated by a single means, and which may be easily operated throughout its control range.

An additional object of this invention is to provide an improved control valve in which balance is maintained even upon the occurrence of surges in fluid pressure.

A further object of this invention is to provide an improved balanced control valve which may be readily removed from a plumbing fixture and in which the parts are accessible for repair or replacement.

A still further object of this invention is to provide an improved control valve which is relatively easy to operate throughout its control range.

Another object of this invention is to provide a balanced control valve having an improved interrelationship of the components thereof.

It is an additional object of this invention to provide a control valve operated by single means and including noval limit means therefor.

It is a further object of this invention to provide an improved control valve having stationary sealing means.

In accordance with an exemplary embodiment of the teachings of the present invention, an improved control valve is provided including a pair of stationary inlet tubes or plugs for receiving fluids, such as hot and cold water. Sleeves are mounted coaxially on the respective inlet plugs, and are coupled for longitudinal and rotational movement together. The inlet plugs and the sleeves have ports and openings substantially normal to inlet fluid flow and the sleeves may be moved longitudinally and rotationally with respect to the inlet plugs to supply the desired mixture and volume of the fluids to an outlet. In an alternative embodiment, sealing means are positioned about the inlet plugs adjacent the ports thereof, and means are coupled with the sleeves to limit their rotational movement.

These and other objects and features of this invention will become more apparent through a detailed consideration of the following description taken in conjunction with the accompanying drawings in which:

FIGURE 1 is a side elevation of a valve embodying the present invention;

FIGURE 2 is an end view, partially in section, of the valve shown in FIGURE 1 taken along the line 2—2 of FIGURE 3;

FIGURE 3 is an enlarged sectional view taken along the line 3—3 of FIGURE 2 and illustrates the valve in one of its "on" positions;

FIGURE 4 is an internal sectional view taken along a line 4—4 of FIGURE 3;

FIGURE 5 is a sectional view similar to that shown in FIGURE 3, but with the valve in an "off" position;

FIGURE 6 is a sectional view similar to FIGURE 5, but illustrates the manner in which the control valve may be readily removed from a fixture;

FIGURE 7 is a side elevation, partially in section, illustrating another "on" position;

FIGURE 8 is a perspective view of certain of the stationary and movable components of the valve;

FIGURE 9 is a side elevation of an alternative valve according to the present invention;

FIGURE 10 is an enlarged side sectional view of the valve shown in FIGURE 9;

FIGURE 11 is a partial side sectional view of the valve of FIGURE 9 illustrating an "on" position;

FIGURE 12 is an end view taken along a line 12—12 of FIGURE 9;

FIGURE 13 is a sectional view taken along a line 13—13 in FIGURE 14; and

FIGURE 14 is another partial side sectional view of the valve of FIGURE 9 showing an "off" position.

Turning first to FIGURES 1 through 8, the same illustrate a mixing type faucet, including a control valve 10 constructed in accordance with the teachings of this invention, and in which the flow of hot and cold water supplied through suitable fittings under an escutcheon 11 is controlled by a knob 12 and discharged through an outlet 13 which may include an aerator. As will appear subsequently, the knob 12 is movable longitudinally with respect to the valve 10 for turning on and off and varying the volume of flow, and may be turned clockwise and counterclockwise (as viewed in FIGURE 2) to appropriately vary the mixture of hot and cold water. An internally threaded coupling 14 allows the valve 10 to be readily removed from the water line fitting for repair or replacement.

Hot and cold water inlets are provided by respective bores 16 and 17 in a fitting or body 18. The body 18 is externally threaded to receive the coupling 14, and further has a peripheral groove within which an O-ring 19 is seated for providing a seal with the interior of a valve housing 15 of the valve 10. An O-ring 20 is seated within a peripheral groove in the housing 15 and is engaged by a flange 21 on the coupling 14. A pin 22 may be provided in the body 18 and mate with a slot 23 in the housing 15 for aligning the body, housing and fluid paths.

The valve 10 includes a pair of stationary tubes or plugs 24 and 25, the ends of which are retained in a mounting plate 26 by means of respective pins 27 and 28. In mounting the valve 10 onto the body 18, the ends of the plugs 24 and 25 adjacent the plate 26 extend into the respective bores 16 and 17 which are provided with gaskets or O-rings 30 and 21, respectively. The plate 26 is retained against the end of the body 18 by an internal shoulder in the housing 15, with the housing 15 being retained by the coupling 14. The other ends 34 and 35, respectively, of the plugs 24 and 25 are closed end of a reduced diameter in the form of pins. Intermediate the ends of the plugs 24 and 25 are respective discharge ports 36 and 37 through which hot and cold water from the respective inlet bores 16 and 17 may pass when the handle 12 is appropriately positioned as will be discussed subsequently. Each plug preferably has a pair of opposed ports (36 or 37, respectively) one being on each side of the plug. It will be appreciated that each of the plugs 24 and 25 may be made from a single piece of cylindrical material with an inlet bore forming a chamber therein, or may be formed from cylindrical tubing with the ends 34 and 35 being solid pins.

Movable sleeves 40 and 41 are coaxially arranged on the respective plugs 24 and 25 and are coupled together by means of respective gears 42 and 43 affixed to the sleeves or forming an integral part thereof. The sleeves 40 and 41 have respective pairs of opposed oval discharge openings 44 and 45 similar to the ports 36 and 37 in the respective plugs 24 and 25. The sleeve 40 includes a pair of internal grooves into which O-rings 48 and 49 are seated, and the sleeve 41 includes similar grooves with O-rings 50 and 51 therein. The sleeves 40 and 41 have respective peripheral grooves 54 and 55 between respective sections of larger diameter, or flanges, 56, 57 and 58, 59. These respective grooves and flanges are provided to allow the sleeves 40 and 41 to mesh, and to rotate or move longitudinally together on the respective plugs 24 and 25.

An end 60 of the sleeve 41 extends through a bore in the end of the valve housing 15 which in turn includes a groove within which an O-ring 61 is seated. An end 34 of the plug 24 serves as an alignment pin and is fitted into a bore 62 in a rotational stop pin 63 extending from the housing 15. The knob 12 is keyed and attached to the end 60 of the sleeve 41 by means of a screw pin 65. A plate 66 is attached to the end of the stop pin 63 by means of a screw 67. A cover 68 is attached to the plate 66 with a screw 69. The cover 68 and plate 66 function as a button or thumb rest to allow leverage in moving the knob 12 longitudinally. The pin 63 extends through an arcuate aperture 70 in the knob 12 to limit the rotational movement of the knob 12.

It will be appreciated that the sleeves 40 and 41 may be moved longitudinally (left and right as viewed in FIGURE 3) on the respective plugs 24 and 25 and the sleeve 41 may be rotated a limited amount on the plug 25 by the knob 12. As the sleeve 41 is rotated, the sleeve 40 is rotated by means of the gears 42 and 43. With the knob 12 pushed to the left against the housing 15 as shown in FIGURE 5, neither hot nor cold water passes through the valve to the outlet 13. With the sleeves 40 and 41 positioned as shown in FIGURE 5, and if the knob 12 is pulled to the right to the position shown in FIGURE 3, cold water passes through the discharge port 37 in the plug 25 and the discharge opening 45 in the sleeve 41 to the outlet 13. A typical longitudinal movement of the knob 12 from full "off" to full "on" may be one-half inch and a typical rotational movement is ninety degrees. With the sleeve 40 rotated ninety degrees and the knob 12 pulled out as shown in FIGURE 7, hot water passes through the discharge port 36 in the plug 24 and the discharge opening 44 in the sleeve 40 to the outlet 13. It thus will be apparent that the volume of water flow through the control valve 10 is determined by the longitudinal position of the sleeves 40 and 41 and the mixture by the rotational positions thereof.

Turning now to FIGURES 9 through 14, the same also illustrate a mixing type faucet similar to that shown in FIGURES 1 through 8 but having improvements incorporated therein. In particular, the valve in FIGURES 9 through 14 include means for limiting the rotational movement of the valve sleeves, and include stationary sealing means on the plugs adjacent the ports thereof.

FIGURES 9 through 14 illustrate a control valve 110 in which the flow of hot and cold water is supplied through respective pipes 111 and 112 attached to a fitting 113, flow being controlled by a knob 114 and discharged through an outlet 115 which may include an aerator. The knob 114 is movable longitudinally with respect to the valve 110 for turning on and off and varying the volume of flow, and may be turned clockwise and counterclockwise (as viewed in FIGURE 12) to appropriately vary the mixture of hot and cold water. An internally threaded coupling 116 allows the valve 110 to be readily removed from the fitting 113 for repair or replacement.

The water lines 111 and 112 communicate with the valve 110 through respective bores 118 and 119. The end of the fitting 113 is externally threaded to receive the coupling 116, and further includes a peripheral groove within which an O-ring 120 is seated for providing a seal with the interior of a valve housing 121 of the valve 110. A gasket 122 is seated within a peripheral groove in the housing 121 and is engaged by a flange 123 on the coupling 116. As will be apparent to those skilled in the art, suitable aligning means, such as keys or pins, may be provided for appropriately aligning the valve 110 with the fitting 113.

The valve 110 includes a pair of stationary tubes or plugs 126 and 127, the ends of which are retained in a mounting plate 128 by means of respective pins 129 and 130. In mounting the valve 110 onto the fitting 113, the ends of plugs 126 and 127 adjacent the plate 128 extend into the respective bores 118 and 119 which are provided with gaskets or O-rings 132 and 133, respectively. The plate 128 is retained against the end of the fitting 113 by an internal shoulder in the housing 121, with the housing 121 being retained by the coupling 116.

The plugs 126 and 127 include respective flange portions 136 and 137 intermediate the ends thereof, and respective pairs of oval discharge ports 138 and 139 substantially normal to the longitudinal axes of the plugs and extending through the flange portions 136 and 137, respectively, thereof. The other ends 142 and 143, respectively, of the plugs 126 and 127 are closed and in the form of pins. The pin 142, which serves as an alignment pin, extends into a bore in the end of the housing 121. The pin 143 extends through the housing 121 and has a button or thumb rest 145 secured to the end thereof by a screw 146.

Sealing means in the form of O-rings 148 and 149 are arranged about the plug 126 adjacent the discharge port 138. The ring 148 is seated in a groove in the flange portion 136 and the ring 149 is held adjacent the opposite side of the flange portion 136 by a metal or plastic retainer sleeve 150. In a similar manner, O-rings 152 and 153 are arranged about the plug 127 adjacent the port 139, with the ring 152 being seated in a groove in the flange portion 137 and the ring 153 held adjacent the side thereof by a retainer sleeve 154. It will be appreciated that hot water may pass through the line 111, the bore 118, and the plug 126 to the discharge port 138, and cold water may pass through the line 112, the bore 119 and the plug 127 to the discharge port 139.

Movable sleeves 160 and 161 are coaxially arranged on the respective plugs 126 and 127. The sleeves 160 and 161 are coupled together by means of respective gears 162 and 163, and by means of a segmented flange 164 on the sleeve 161 mating with a peripheral groove 165 on the sleeve 160. If desired, a sleeve 161 may be formed from two tubular sections 168 and 169 as shown in FIGURE 10. The gear 163 may be formed on the section 169 and the segmented flange 164 formed on the section 168. The sections 168 and 169 of the sleeve 161 may be secured together by soldering. The gears 162 and 163 and the flange 164 may be separate from the sleeve 161 and secured thereto by soldering. The section 169 passes through the end of the housing 121, which has an O-ring 170 seated. The sleeves 160 and 161 include respective discharge openings 172 and 173 which may take the form of respective holes 174 and 175.

The sleeves 160 and 161 may be moved longitudinally (left and right as viewed in FIGURE 10) on the respective plugs 126 and 127 and the sleeve 161 may be rotated a limited amount on the plug 127 by the knob 114. The segmented flange 164 on the sleeve 161 and the peripheral groove 165 on the sleeve 160 couple these sleeves for longitudinal movement. The rotational movement of the sleeves is limited by the segmented flange 164 as it abuts the interior of the housing 121. As the sleeve 161 is rotated by the knob 114, the sleeve 160 is rotated by means of the gears 162 and 163.

With the knob 114 in the positions shown in FIGURES 10 and 14, neither hot nor cold water passes through the valve to the outlet 115. With the sleeves 160 and 161 rotated to the position shown in FIGURES 10 and 14, and if the knob 114 is pulled to longitudinally position the sleeves as shown in FIGURE 11, hot water passes through the discharge port 138 and the discharge opening 172 to the outlet 115. If the knob 114 is rotated clockwise to its limit (as determined by the segmented flange 164 striking the interior of the housing 121), the discharge opening 173 registers with the port 139 thereby allowing cold water to pass therethrough to the outlet 115. It thus will be apparent that the volume of water flow through the control valve 110 is determined by the longitudinal position of the sleeves 160 and 161 and the mixture by the rotational positions thereof. A typical longitudinal movement of the knob 114 from full "off" to full "on" may be approximately four-tenths of an inch, with a typical rotational range of ninety degrees.

We claim:
1. A control valve comprising a plurality of tubular means having respective inlets in a first end thereof, the second ends thereof being closed to form respective chambers, said tubular means having discharge ports intermediate the ends thereof communicating with respective chambers, a first of said inlets communicating through a first chamber with a first of said discharge ports and a second of said inlets communicating through a second of said chambers with a second of said discharge ports, a plurality of sleeve means respectively mounted over said tubular means, each of said sleeve means having a discharge opening therein and coupling means for coupling said sleeve means together, and means coupled with one of said sleeve means for varying the longitudinal and rotational position of said plurality of sleeve means with respect to said tubular means to enable selective registration of a discharge opening with a discharge port.

2. A control valve comprising plug means having inlets adapted to receive fluid along the longitudinal axis of said plug means, and having discharge ports intermediate the ends of said plug means and approximately normal to the longitudinal axis thereof, said inlets communicating with respective discharge ports,
plural sleeve means mounted over said plug means, each of said sleeve means having a discharge opening therein and sealing means adjacent said opening, and each of said sleeve means further including coupling means for longitudinally and rotationally coupling together said sleeve means, and
means coupled with said sleeve means for varying the position of said sleeve means with respect to said plug means to enable selective registration of a discharge opening with a discharge port.

3. A control valve comprising plug means having chambers therein and having inlets in an end thereof communicating with respective chambers and adapted to receive fluid along the longitudinal axis of said plug means, and discharge ports communicating with respective chambers and being longitudinally offset from one another,
sleeve means mounted coaxially with respect to said plug means and having like longitudinally offset discharge openings therein, and
means coupled with said sleeve means for longitudinally and rotationally positioning said sleeve means with respect to said plug means to enable selective registration of said discharge openings with respective discharge ports.

4. A control valve comprising a plurality of tubular means having respective inlets adapted to receive fluid along the longitudinal axes of said tubular means, said tubular means having discharge ports communicating with respective inlets,
a plurality of sleeve means respectively mounted coaxially with said tubular means, said sleeve means having discharge openings therein and having coupling means including meshing gears for coupling said sleeve means for longitudinal and rotational movement together, and
means coupled with at least one of said sleeve means for varying the longitudinal and rotational positions of said sleeve means with respect to said tubular means to enable overlap of a discharge opening with a discharge port.

5. A control valve comprising a plurality of tubular means having respective inlets adapted to receive fluid along the longitudinal axes of said tubular means, said tubular means having discharge ports longitudinally offset from one another communicating with respective inlets,
a plurality of sleeve means respectively mounted coaxially with said tubular means, said sleeve means having like longitudinally offset discharge openings therein and having coupling means including meshing gears for coupling said sleeve means for longitudinal and rotational movement together, and
means coupled with at least one of said sleeve means for varying the longitudinal and rotational positions of said sleeve means with respect to said tubular means to enable movement of a discharge opening to overlap a discharge port.

6. A control valve comprising a housing, a pair of plugs mounted substantially parallel in said housing with each of said plugs having an inlet in a first end thereof and a second closed end, said plugs having discharge ports intermediate the ends thereof and longitudinally offset from one another communicating with respective inlets, a pair of sleeve means respectively mounted over said plugs, said sleeve means having like longitudinally offset discharge openings therein and sealing means adjacent said openings, said sleeve means further having mating portions including meshing gears for coupling together said sleeve means for longitudinal and rotational movement, knob means coupled with one of said sleeve means for moving said pair of sleeve means with respect to said pair of plugs to enable selective and variable registration of discharge openings with respective discharge ports, and means coupled with an end of said housing and located adjacent said knob means for enabling leverage action when operating said knob means.

7. A balanced control valve comprising a housing, a pair of substantially parallel plugs mounted in said housing with each having an inlet in a first end thereof adapted to receive fluid along the longitudinal axis thereof and a closed second end thereby forming a chamber therein, each of said plugs having a discharge port intermediate the ends thereof and approximately normal to the longitudinal axis thereof, said discharge ports being longitudinally offset from one another and communicating through respective chambers with respective inlets, a pair of sleeve means respectively coaxially mounted over said plugs, said sleeve means having like longitudinally offset discharge openings therein and sealing means adjacent said openings, said sleeve means further having flanged and grooved portions for coupling said pair of sleeve means for longitudinal movement together and having meshing gears for coupling said sleeve means for rotational movement together, knob means coupled with one of said sleeve means for moving said pair of sleeve means with respect to said pair of plugs to enable selective and variable registration of discharge openings with respective discharge ports, and means coupled with an end of said housing for enabling leverage action when operating said knob means.

8. A control valve comprising plug means having inlets in an end thereof adapted to receive fluid along the longitudinal axis of said plug means and flange means intermediate the ends thereof, discharge ports extending through said flange means, and sealing means arranged about said plug means adjacent said flange means, sleeve means mounted over said plug means and having discharge openings therein capable of overlapping said ports, and means for varying the relative longitudinal and rotational position of said sleeve means with respect to said plug means to enable registration of a discharge opening with a discharge port.

9. A control valve comprising plug means having inlets adapted to receive fluid along the longitudinal axis of said plug means, and having discharge ports intermediate the end of said plug means and approximately normal to the longitudinal axis thereof, said inlets communicating with respective discharge ports, and said plug means including sealing means arranged thereon adjacent said ports, plural sleeve means mounted over said plug means, each said sleeve means having a discharge opening therein and means for longitudinally and rotationally coupling together said sleeve means, and means coupled with said sleeve means for varying the position of said sleeve means with respect to said plug means to enable selective registration of a discharge opening with a discharge port.

10. A control valve comprising a plurality of tubular means having respective inlets adapted to receive fluid along the longitudinal axes of said tubular means, said tubular means having discharge ports approximately normal to the longitudinal axes thereof communicating with respective inlets, a plurality of sleeve means respectively mounted coaxially with said tubular means, said sleeve means having discharge openings therein and having coupling means including meshing teeth for rotationally coupling said sleeve means, said coupling means including a segmented flange on one of said sleeve means and a peripheral groove on another of said sleeve means for longitudinally coupling said sleeve means, and means coupled with said sleeve means for varying the longitudinal and rotational position of said sleeve means with respect to said tubular means to enable overlap of a discharge opening with a discharge port.

11. A control valve comprising a plurality of tubular means having respective inlets adapted to receive fluid along the longitudinal axes of said tubular means, said tubular means having discharge ports approximately normal to the longitudinal axes thereof communicating with respective inlets, a plurality of sleeve means respectively mounted coaxially with said tubular means, said sleeve means having discharge openings therein and having coupling means including meshing teeth for rotationally coupling said sleeve means, said coupling means including a segmented flange on one of said sleeve means and a peripheral groove on another of said sleeve means for longitudinally coupling said sleeve means, stop means engaged by portions of said segmented flange for limiting the rotational movement of said sleeve means, and means coupled with said sleeve means for varying the longitudinal and rotational position of said sleeve means with respect to said tubular means to enable overlap of a discharge opening with a discharge port.

12. A control valve comprising a housing, a plurality of tubular means mounted in said housing having respective inlets adapted to receive fluid along the longitudinal axes of said tubular means, said tubular means having discharge ports approximately normal to the longitudinal axes thereof communicating with respective inlets, a plurality of sleeve means respectively mounted coaxially over said tubular means, said sleeve means having discharge openings therein and having coupling means for rotationally and longitudinally coupling said sleeve means, said coupling means including a flange on one of said sleeve means which engages said housing at rotary limits of said one sleeve means to limit the rotary motion thereof, and means coupled with said sleeve means for varying the longitudinal and rotational position of said sleeve means with respect to said tubular means to enable overlap of a discharge opening with a discharge port.

13. A control valve comprising plug means having inlets adapted to receive fluid along the longitudinal axis of said plug means, and having discharge ports intermediate the ends of said plug means and approximately normal to the longitudinal axis thereof, said inlets communicating with respective discharge ports, and said plug means including sealing means arranged thereon adjacent said ports, plural sleeve means mounted on said plug means, said sleeve means having discharge openings therein and having coupling means including meshing gears for rotationally coupling said sleeve means, said coupling means including a segmented flange on one of said sleeve means and a peripheral groove on another of said sleeve means for longitudinally coupling said sleeve means, and means coupled with said sleeve means for varying the longitudinal and rotational position of said sleeve means with respect to said tubular means to enable overlap of a discharge opening with a discharge port.

14. A control valve comprising a housing, a plurality of tubular means mounted in said housing and having respective inlets adapted to receive fluid along the longitudinal axes of said tubular means, said tubular means having discharge ports approximately normal to the longitudinal axes thereof communicating with respective inlets and respective sealing means arranged thereon adjacent said ports, a plurality of sleeve means respectively mounted coaxially over said tubular means, said sleeve means having discharge openings therein and having coupling means for rotationally and longitudinally coupling said sleeve means, said coupling means including a segmented flange on one of said sleeve means mating with a peripheral groove on another of said sleeve means, said flange engaging said housing at rotary limits of said one sleeve means to limit the rotary motion thereof, and means coupled with said sleeve means for varying the longitudinal and rotational position of said sleeve means with respect to said tubular means to enable overlap of a discharge opening with a discharge port.

References Cited

UNITED STATES PATENTS

| | | | |
|---|---|---|---|
| 2,177,349 | 10/1939 | Corbin | 137—636.4 |
| 2,575,305 | 11/1951 | Stryzakoski | 137—607 X |
| 2,870,787 | 1/1959 | Rossi | 137—636.4 X |
| 3,105,519 | 10/1963 | Fraser | 137—636.4 X |

CLARENCE R. GORDAN, Primary Examiner

U.S. Cl. X.R.

137—636

Disclaimer 3,460,570.—*Ernest H. Bucknell* and *Irving A. Ward*, Los Angeles, Calif. BALANCED CONTROL MIXING VALVE. Patent dated Aug. 12, 1969. Disclaimer filed Feb. 23, 1976, by the assignee, *Pearl White Bletcher*, part interest.

Hereby enters this disclaimer to her entire interest in all claims of said patent.

[*Official Gazette June 15, 1976.*]